Sept. 22, 1942.   W. R. GRISWOLD   2,296,521
MOTOR VEHICLE
Filed Dec. 6, 1940
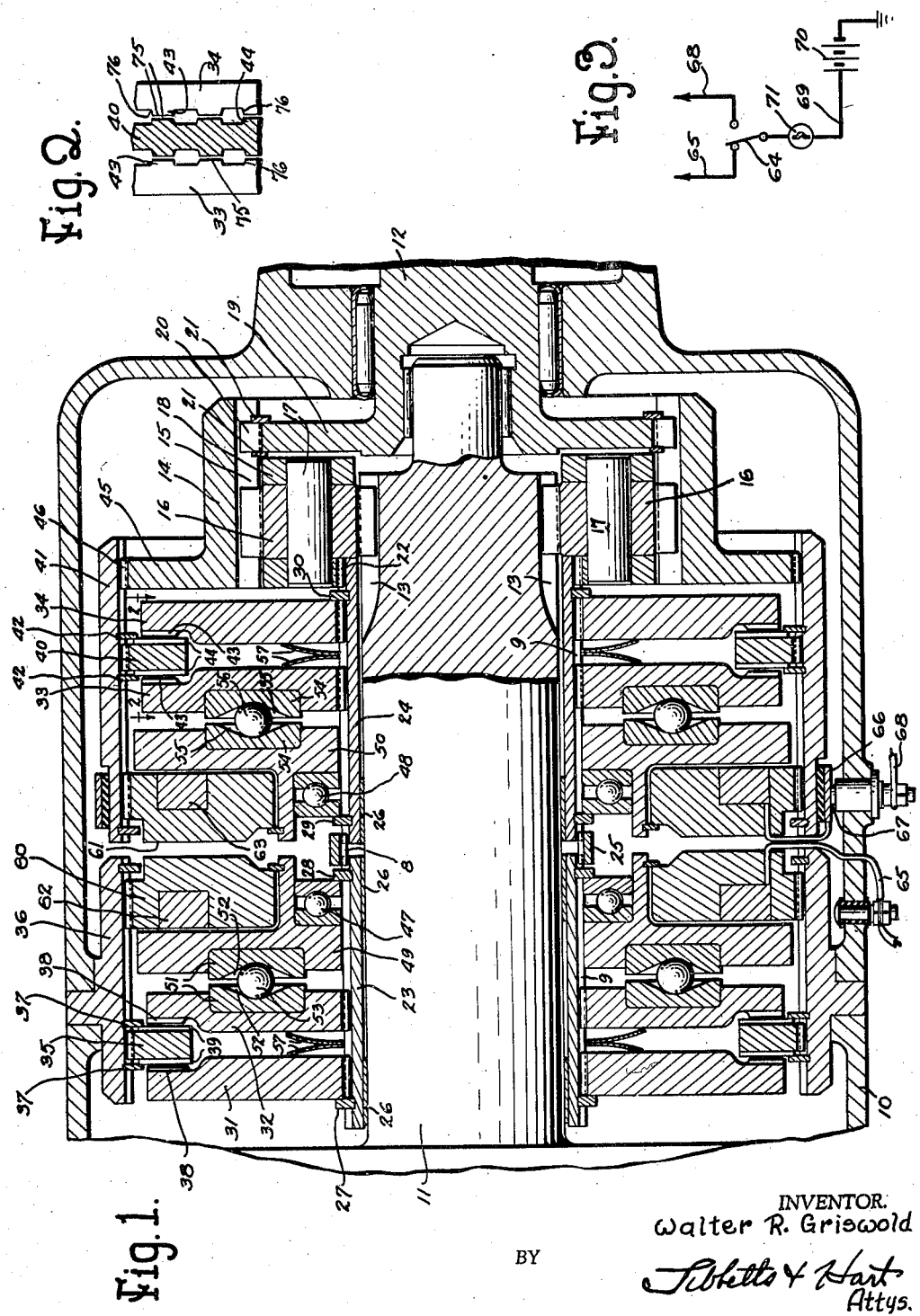
INVENTOR.
Walter R. Griswold
BY
Sibbitts & Hart
Attys.

Patented Sept. 22, 1942

2,296,521

UNITED STATES PATENT OFFICE 2,296,521

MOTOR VEHICLE

Walter R. Griswold, Detroit, Mich., assignor to Packard Motor Car Company, Detroit, Mich., a corporation of Michigan Application December 6, 1940, Serial No. 368,814

12 Claims. (Cl. 74—298)

This invention relates to drive mechanism and more particularly to forward and reverse mechanism.

In drive mechanism employing a fluid torque converter, the forward speeds are developed in accordance with operating conditions. There is usually a shiftable mechanism for establishing forward or reverse drive and shifting of such mechanism is opposed by a force, known as "drag," exerted by the torque converter tending to hold the mechanism in engaged relation. This condition is undesirable as it delays the shift and places too great a physical effort on the driver when the shift is effected manually.

An object of this invention is to provide drive mechanism of the character mentioned in which the shift between forward and reverse drive can be made quickly and with relatively little physical effort.

Another object of the invention is to provide forward and reverse drive mechanism in which the shift is effected by servo-mechanism under the influence of magnet devices.

Another object of the invention is to provide a geared-together drive with a positive forward and reverse shift mechanism that can be moved from either engagement to the other with minimum effort.

Other objects of the invention will appear from the following description taken in connection with the drawing, which forms a part of this specification, and in which:

Fig. 1 is a vertical sectional view through a fragment of drive mechanism having the invention incorporated therein;

Fig. 2 is a sectional view taken on line 2—2 of Fig. 1;

Fig. 3 is a diagrammatic view of the electrical system leading to the magnetic shift devices.

In the drawing only a portion of a drive mechanism is illustrated, the drive mechanism casing 10 carrying the drive shaft 11 and the driven shaft 12. The drive shaft can be connected with a fluid torque converter or some other form of power device, and the driven shaft 12 can be arranged to transmit power at a suitable point, such as the axle of a motor vehicle. The two shafts 11 and 12 are connected in driving relation by controlled planetary gearing. In such gearing the sun gear is fixed to the drive shaft and consists of teeth 13 formed preferably directly on such shaft. A ring gear 14 having internal teeth 15 encircles the sun gear and the planet pinions 16 are arranged between and in mesh with the teeth of such gears. The planet pinions 16 are mounted on shafts 17 extending across openings in the carrier 18 that is freely mounted on shaft 11. An end 19 of the driven shaft is outwardly flanged and formed with peripheral teeth 20 that are engaged with the internal teeth 15 of the ring gear. This flange is retained in an axial position by resilient snap rings 21 seated in suitable grooves formed in the ring gear teeth.

It is proposed to control the planetary gearing by mechanism that can be selectively actuated to hold one portion of the planetary gearing to provide a reverse drive or to lock two portions of the planetary gearing together to provide a direct forward drive. A sleeve structure, consisting of two sections 23 and 24 joined together by a coupling member 25, is freely mounted on the drive shaft. These sections are formed with external splines 9 which slidably interengage with internal teeth 8 of the bridging coupling member. The splines at one end of sleeve section 24 slidably engage with splines 22 formed at one end of the carrier. The two sleeve sections are slidable relatively in an axial direction, the coupling 25 holding them in connected relation in any position of such adjustment and the sleeve section 24 is slidable axially relative to the carrier. Bearings 26 are arranged between the sleeve sections and the drive shaft.

A pair of stop members in the form of resilient snap rings 27 and 28 are seated in spaced relation in grooves in the sleeve 23 and another pair of similar stop members 29 and 30 is seated in spaced relation in grooves formed in the sleeve section 24. A pair of brake or holding elements 31 and 32 is slidably splined on the sleeve section 23 and a pair of clutch elements 33 and 34 is slidably splined on the sleeve section 24, the element 31 lying adjacent the stop member 27 and the element 34 lying adjacent the stop member 30. Between the elements 31 and 32 is a ring member 35 that is splined to an annular flange 36 forming a portion of the casing 10, and this ring member is retained from being axially displaced by resilient snap ring members 37 seated in recesses in the flange 36. The adjacent faces of the elements 31 and 32 are formed with radial teeth 38 that are adapted to interengage with radial teeth 39 formed on the two faces of the ring member 35.

Between the elements 33 and 34 is arranged a ring member 40 that is splined to internal teeth on a sleeve 41, such ring member being retained in a fixed axial position by resilient snap ring members 42 seated in recesses in the sleeve

41. The adjacent faces of the elements 33 and 34 are formed with radial teeth 43 and the faces of the ring member 40 are formed with radial teeth 44 adapted to be engaged by the teeth 43. The ring gear 14 is formed with a flange 45 having peripheral teeth 46 engaging with the internal teeth of the sleeve 41. The sleeve 41, the ring gear and the driven shaft will rotate together as a unit.

The elements 31 and 32 are moved toward each other so that their teeth 38 engage with the teeth 39 on ring 35 by a means that preferably includes servo-mechanism and an electromagnetic device and the elements 33 and 34 are moved to engage the teeth 44 of ring member 40 by a similar means. A thrust bearing 47 is arranged adjacent the stop member 28 and a similar bearing 48 is arranged adjacent the stop member 29. Abutting the bearing 47 is an armature 49 and abutting the bearing 48 is an armature 50. The element 32 and the armature 49 are provided with hardened inserts 51 having similar but oppositely disposed angular depressions 52 between which balls 53 are arranged. The armature 50 and the element 33 are likewise provided with hardened inserts 54 having similar but oppositely disposed recesses 55 between which balls 56 are arranged. Means is provided between the pairs of elements to normally hold them apart so that they will be disengaged from ring members 35 and 40, and in the present instance such means takes the form of ring spring members 57. These spring means hold the elements 31 and 34 against their adjacent stop members and exert pressure against the elements 32 and 33 urging the balls 53 and 56, the armatures and thrust bearings toward the stop members 28 and 29. Thus the springs normally tend to hold the actuating mechanisms so that the balls lie in the deepest portions of the recesses of the hardened inserts to thus place such mechanism in ineffective position.

The armatures are actuated by magnets 60 and 61, the magnet 60 having a winding 62 and the magnet 61 having a winding 63. The winding 62 is connected with a switch 64 by a conductor line 65. The winding 63 leads to a conductor ring 66 suitably mounted in insulated relation on a reduced end of sleeve 41 and a brush 67 engages this ring and connects with a conductor line 68 that leads to the switch 64. The switch 64 is connected with conductor line 69 leading to the vehicle battery 70, and in the line 69 is the ignition switch 71. The switch 64 is of a two-circuit selective type so that when the ignition switch is turned on one or the other of the magnets can be energized.

When the magnet 60 is energized it will draw the armature 49 thereto, thus slowing up rotation of the armature and thereby causing the balls 53 to ride away from centered position and force the brake element 32 into engagement with the ring member 35. This movement of the armature will also move the thrust bearing 47 therewith which in turn will cause similar movement of the stop member 28, the sleeve section 23, stop member 27, and the element 31. Thus the elements 31 and 32 are moved toward each other into positive clamping engagement with the stationary ring member 35 whereby the sleeve sections 23 and 24 and the carrier, interengaged with the sleeve section 24, will be held stationary. While the carrier is held stationary, the planet pinions will be rotated on their shafts by the sun gear to drive the ring gear and the driven shaft in an opposite direction to that in which the drive shaft is turning so that reverse drive through the planetary gearing is thereby established.

When the magnet 63 is energized the armature 50 will be moved toward it, whereupon the balls 56 will ride away from centered position forcing element 33 into engagement with the ring member 40. This movement of the armature will also move the thrust bearing, the stop member 29 and the sleeve section 24 therewith and, as the stop member 30 moves with such sleeve section, the element 34 will be moved into engagement with the ring member 40. Thus the elements 33 and 34 are clamped to the ring member with their adjacent teeth in engagement. The sleeve 41, to which the ring gear 14 is fixed, and the sleeve section 24 to which the carrier is drivingly connected will thus be locked together so that they will have to rotate in unison, and thus direct forward drive will be established.

When there is no provision in the drive mechanism for disconnecting the drive shaft from the source of power, such as with some types of fluid torque converter drive mechanisms, the forward and reverse mechanism is subject to a force, known as "drag," tending to resist a change from the established driving relation. The servo-mechanisms, previously referred to, are employed to boost the operating force required to overcome such "drag" when shifting, and the teeth 38, 39, 43 and 44 are designed to assist their engagement and disengagement. The teeth are similar and formed with a relatively wide peripheral face 75 and with side faces 76 that extend therefrom at an angle several degrees more than a right angle. This angular formation of the side faces of the teeth will allow quicker and easier engagement and disengagement than is possible with a tooth form having side faces extending at a right angle to the peripheral face.

With the mechanism shown and described, planetary gearing can be readily controlled to establish either forward or reverse drives in drive mechanism in which power is not disconnected during the change.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. Drive mechanism comprising a power drive shaft, a driven shaft, planetary gearing drivingly connecting said shafts, means shiftable to hold one portion of the planetary gearing to effect reverse drive therethrough, means shiftable to lock two portions of the planetary gearing together to effect direct drive therethrough, servo-mechanism operable to control said shiftable holding means and locking means, and magnetic means for controlling said servo-mechanism to selectively shift said locking means or said holding means into effective position.

2. Drive mechanism comprising a power drive shaft, a driven shaft, planetary gearing drivingly connecting said shafts, a pair of elements shiftable to hold one portion of the planetary gearing stationary to effect reverse drive therethrough, a pair of elements shiftable to lock two portions of the planetary gearing together to effect direct forward drive therethrough, means normally urging said two pairs of elements out of effective position, and magnetically responsive means operable to selectively shift either pair of elements into effective position.

3. Drive mechanism comprising a casing, a power drive shaft, a driven shaft, planetary gearing drivingly connecting said shafts including a planet gear carrier, a pair of elements fixed to rotate with said carrier and oppositely shiftable to clamp against a portion of the casing, means normally urging said pair of elements apart, and servo-mechanism operable to shift said pair of elements into clamping engagement with the casing.

4. Drive mechanism comprising a power drive shaft, a driven shaft, planetary gearing having a sun gear fixed to rotate with the drive shaft, a ring gear fixed to rotate with the driven shaft and a planet gear carrier freely mounted on the drive shaft, two pairs of elements slidably splined on the carrier, means normally spacing each pair of elements, a fixed ring between one pair of elements, a ring between the other pair of elements fixed to rotate with the ring gear, and means operable to alternately clamp the pairs of elements with the adjacent ring.

5. In a drive mechanism having a power drive shaft, a driven shaft and planetary gearing including a sun gear fixed to rotate with the power shaft, a ring gear fixed to rotate with the driven shaft and a planet gear carrier freely mounted on the drive shaft, control mechanism for the planetary gearing comprising a sectional sleeve connected to rotate as a unit, one section of said sleeve being slidably splined to the carrier and the sleeve sections being axially movable relatively, a pair of shiftable elements slidably splined on each sleeve section, a fixed ring adapted to be clamped by the elements on one sleeve section, a ring fixed to rotate with the ring adapted to be clamped by the elements on another sleeve section, means normally unclamping the elements from the rings, and means operable to move one or the other pair of elements into clamping position.

6. In a drive mechanism having a power drive shaft, a driven shaft and planetary gearing including a sun gear fixed to rotate with the power shaft, a ring gear fixed to rotate with the driven shaft and a planet gear carrier freely mounted on the drive shaft, control mechanism for the planetary comprising a sleeve formed of coupled sections movable axially and relatively, one of said sleeve sections being slidably splined to the carrier, spaced stop members on each sleeve section, a pair of elements slidably splined on each sleeve section between the stop members, means urging each pair of elements apart, a ring member between each pair of elements, one of said ring members being fixed stationary and the other ring member being fixed to rotate with the ring gear, and means operable to selectively move each pair of elements into clamping relation with the intermediate ring member.

7. In a drive mechanism having a power drive shaft, a driven shaft and planetary gearing including a sun gear fixed to rotate with the drive shaft, a ring gear fixed to rotate with the driven shaft and a carrier freely mounted on the drive shaft, control mechanism for the planetary gearing comprising a coupled, two-section sleeve, one of said sleeve sections being slidably splined to said carrier and the sections being movable axially relatively, spaced stop means on each sleeve section, a pair of elements slidably splined on each sleeve section between the stop members, springs urging each pair of elements apart, a ring member between each pair of elements, one of said ring members being stationary and the other ring member being fixed to rotate with said ring gear, means operable to clamp each pair of elements with the intermediate ring member, and magnetic means for selectively operating the clamping means for each pair of elements.

8. In a drive mechanism having a power drive shaft, a driven shaft and planetary gearing including a sun gear fixed to rotate with the drive shaft, a ring gear fixed to rotate with the driven shaft and a carrier freely mounted on the drive shaft, control mechanism for the planetary gearing comprising a coupled, two-section sleeve, one of said sleeve sections being slidably splined to said carrier and the sections being movable axially relatively, spaced stop means on each sleeve section, a pair of elements slidably splined on each sleeve section between the stop members, springs urging each pair of elements apart, a ring member between each pair of elements, one of said ring members being stationary and the other ring member being fixed to rotate with said ring gear, means including servo-mechanism operable to clamp each pair of elements with the intermediate ring member, and magnetic means for selectively operating the clamping means for each pair of elements.

9. In a drive mechanism having a power drive shaft, a driven shaft and planetary gearing including a sun gear fixed to rotate with the drive shaft, a ring gear fixed to rotate with the driven shaft and a carrier freely mounted on the drive shaft, control mechanism for the planetary gearing comprising a coupled, two-section sleeve, one of said sleeve sections being slidably splined to said carrier and the sections being movable axially relatively, spaced stop means on each sleeve section, a pair of elements slidably splined on each sleeve section between the stop members, springs urging each pair of elements apart, a ring member between each pair of elements, one of said ring members being stationary and the other ring member being fixed to rotate with said ring gear, means operable to clamp each pair of elements with the intermediate ring member, electromagnetic means operable to actuate said clamping means, and a switch operable to control the current passing to the electromagnetic means one at a time, and magnetic means for selectively operating the clamping means for each pair of elements.

10. Drive mechanism comprising a power drive shaft, a driven shaft, planetary gearing having a sun gear fixed to rotate with the drive shaft, a ring gear fixed to rotate with the driven shaft and a planet gear carrier freely mounted on the drive shaft, a sectional coupled sleeve slidably splined to the carrier, said sections of the sleeve being movable axially relatively, a pair of toothed elements slidably splined on each sleeve section, a toothed ring member between each pair of elements, one of said ring members being stationary and the other ring member being fixed to rotate with the ring gear, spring means between each pair of elements urging them apart, and means operable to selectively move the pairs of elements so that their teeth will interengage with the teeth of the intermediate ring member.

11. In drive mechanism having a power drive shaft, a driven shaft and planetary gearing including a sun gear fixed to rotate with the drive shaft, a ring gear fixed to rotate with the driven shaft and a planet gear carrier freely mounted on the drive shaft, mechanism for controlling said planetary gearing to effect either direct drive or reverse drive comprising a sectional coupled sleeve mounted on the drive shaft, one of said sleeve sections being slidably splined to the carrier and said sections being axially slidable relatively, a pair of spaced stop members fixed on each sleeve section, a pair of toothed elements slidably splined on each sleeve section between the stop members, one of each pair of elements abutting a stop member, a thrust bearing abutting each of the other stop members, an armature abutting each bearing, servo-mechanism between each armature and the adjacent element, a ring member between each pair of elements having toothed faces adapted to interengage with the teeth of the adjacent elements, one of said ring members being stationary and the other ring member fixed to rotate with the ring gear, spring means urging each pair of elements apart, magnet means operable to actuate said armatures in a direction to move the pairs of elements into toothed engagement with the ring members, and means operable to selectively energize the magnet means.

12. Drive mechanism comprising a power drive shaft, a driven shaft, planetary gearing drivingly connecting said shafts, a pair of elements shiftable to hold one portion of the planetary gearing stationary to effect reverse drive therethrough, a pair of elements shiftable to lock two portions of the planetary gearing together to effect direct forward drive therethrough, means normally urging said two pairs of elements out of effective position, servo-mechanism responsive to torque for shifting said pairs of elements into effective position, and means operable to selectively control the servo-mechanisms.

WALTER R. GRISWOLD.